United States Patent
Sprague et al.

(10) Patent No.: US 11,128,372 B2
(45) Date of Patent: *Sep. 21, 2021

(54) OPTICAL POINT SOURCE DETECTION LOCATING SENSOR

(71) Applicant: Advanced Photon Applications, LLC, Bedford, TX (US)

(72) Inventors: Michaelene Williams Sprague, Coppell, TX (US); James Anton Harder, Bedford, TX (US)

(73) Assignee: ADVANCED PHOTON APPLICATIONS, LLC, Bedford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,810

(22) Filed: Jun. 9, 2020

(65) Prior Publication Data

US 2020/0304203 A1     Sep. 24, 2020

Related U.S. Application Data

(63) Continuation-in-part of application No. 16/175,548, filed on Oct. 30, 2018, now Pat. No. 10,680,720.

(60) Provisional application No. 62/581,825, filed on Nov. 6, 2017.

(51) Int. Cl.
| | |
|---|---|
| *H04B 10/077* | (2013.01) |
| *G01S 3/78* | (2006.01) |
| *G01S 17/06* | (2006.01) |
| *G01S 7/481* | (2006.01) |
| *H04B 10/25* | (2013.01) |
| *H04B 10/80* | (2013.01) |

(52) U.S. Cl.
CPC ............ *H04B 10/0773* (2013.01); *G01S 3/78* (2013.01); *G01S 7/4818* (2013.01); *G01S 17/06* (2013.01); *H04B 10/25* (2013.01); *H04B 10/80* (2013.01)

(58) Field of Classification Search
CPC .... H04B 10/0773; H04B 10/80; H04B 10/25; G01S 7/4818; G01S 17/06; G01S 3/78; G01S 5/16; G01S 3/781; G01S 3/783; F41G 7/2293
See application file for complete search history.

(56) References Cited

U.S. PATENT DOCUMENTS

| | | |
|---|---|---|
| 5,555,119 A | 9/1996 | Lewis |
| 5,705,811 A | 1/1998 | Harder et al. |
| 5,745,285 A | 4/1998 | Harder et al. |
| 5,866,900 A | 2/1999 | Jacobson et al. |
| 5,969,885 A | 10/1999 | Harder et al. |

(Continued)

*Primary Examiner* — Leslie C Pascal
(74) *Attorney, Agent, or Firm* — Hauptman Ham, LLP

(57) ABSTRACT

A system for processing optical signals comprising a reference optical signal transmission structure configured to receive an optical signal at a first input and to provide the optical signal at a first output to a photodetector. A delay optical signal transmission structure configured to receive the optical signal at a second input and to provide a delayed optical signal at a second output to the photodetector. A signal processor configured to receive a first electric signal corresponding to the optical signal and a second electric signal corresponding to the delayed optical signal and to generate an output as a function of the first electric signal and the second electric signal.

27 Claims, 14 Drawing Sheets

(56) References Cited

U.S. PATENT DOCUMENTS 9,891,099 B2    2/2018   Harder et al.
10,680,720 B2 *   6/2020   Sprague ............... G01C 15/002

* cited by examiner

| Time Interval | Deconvolution process | Normalized Amplitudes for 4 overlapping pulses | | | | | Normalized pulse |
|---|---|---|---|---|---|---|---|
| | | A | B | C | D | Sum | |
| 0 | | 0 | | | | 0 | 0 |
| 1 | | 0.004545 | | | | 0.004545 | 0.090909 |
| 2 | | 0.013636 | | | | 0.013636 | 0.272727 |
| 3 | Known | 0.031818 | derived | | | 0.031818 | 0.636364 |
| 4 | | 0.045455 | using A | | | 0.045455 | 0.909091 |
| 5 | | 0.05 | values | | | 0.05 | 1 |
| 6 | | 0.05 | | | | 0.05 | 1 |
| 7 | | 0.0975 | 0.018182 | | | 0.055682 | 0.75 |
| 8 | | 0.031818 | 0.054545 | | | 0.086364 | 0.636364 |
| 9 | | 0.027273 | 0.127273 | derived | | 0.154545 | 0.545455 |
| 10 | | 0.022727 | 0.181818 | using B | | 0.204545 | 0.454545 |
| 11 | | 0.018182 | 0.2 | values | | 0.218182 | 0.363636 |
| 12 | | 0.015909 | 0.2 | | | 0.215909 | 0.318182 |
| 13 | Derived using | 0.013409 | 0.15 | 0.009091 | | 0.1725 | 0.268182 |
| 14 | first 6 amplitude | 0.011136 | 0.127273 | 0.027273 | | 0.165682 | 0.222727 |
| 15 | values and | 0.009773 | 0.109091 | 0.063636 | derived | 0.1825 | 0.195455 |
| 16 | pulse shape | 0.008182 | 0.090909 | 0.090909 | using C | 0.19 | 0.163636 |
| 17 | | 0.007273 | 0.072727 | 0.1 | values | 0.18 | 0.145455 |
| 18 | | 0.006136 | 0.063636 | 0.1 | | 0.169773 | 0.122727 |
| 19 | | 0.005227 | 0.053636 | 0.075 | 0.059091 | 0.192955 | 0.104545 |
| 20 | | 0.004545 | 0.044545 | 0.063636 | 0.177273 | 0.29 | 0.090909 |
| 21 | | 0 | 0.039091 | 0.054545 | 0.413636 | 0.507273 | |

FROM FIG. 13A

| # | label | | | | | | |
|---|---|---|---|---|---|---|---|
| 22 | Derived using | 0 | 0.032727 | 0.045455 | 0.590909 | 0.669091 | |
| 23 | first 6 amplitude | | 0.029091 | 0.036364 | 0.65 | 0.715455 | |
| 24 | values and | | 0.024545 | 0.031818 | 0.65 | 0.706364 | |
| 25 | pulse shape | 0 | 0.020909 | 0.026818 | 0.4875 | 0.535227 | |
| 26 | | 0 | 0.018182 | 0.022273 | 0.413636 | 0.454091 | |
| 27 | | 0 | 0 | 0.019545 | 0.354545 | 0.374091 | |
| 28 | Derived using | 0 | 0 | 0.016364 | 0.295455 | 0.311818 | |
| 29 | first 6 amplitude | | | 0.014545 | 0.236364 | 0.250909 | |
| 30 | values and | 0 | 0 | 0.012273 | 0.206818 | 0.219091 | |
| 31 | pulse shape | 0 | 0 | 0.010455 | 0.174318 | 0.184773 | |
| 32 | | 0 | 0 | 0.009091 | 0.144773 | 0.153864 | |
| 33 | | | 0 | 0 | 0.127045 | 0.127045 | |
| 34 | | | 0 | 0 | 0.106364 | 0.106364 | |
| 35 | | | 0 | 0 | 0.094545 | 0.094545 | |
| 36 | | | 0 | 0 | 0.079773 | 0.079773 | |
| 37 | | | 0 | 0 | 0.067955 | 0.067955 | |
| 38 | | | 0 | 0 | 0.059091 | 0.059091 | |
| 39 | | | 0 | 0 | 0 | 0 | |
| 40 | | | 0 | 0 | 0 | 0 | |
| 41 | | | 0 | 0 | 0 | 0 | |
| 42 | | | 0 | 0 | 0 | 0 | |
| 43 | | | 0 | 0 | 0 | 0 | |
| 44 | | | 0 | 0 | 0 | 0 | |
| 45 | | | 0 | 0 | 0 | 0 | |
| 46 | | | 0 | 0 | 0 | 0 | |
| 47 | | | 0 | 0 | 0 | 0 | |
| 48 | | | 0 | 0 | 0 | 0 | |
| 49 | | | 0 | 0 | 0 | 0 | |
| 50 | | | 0 | 0 | 0 | 0 | |

FIG. 13B

|  | Time Interval | Normalized amplitudes for 4 overlapping pulses | | | | | | | |
|---|---|---|---|---|---|---|---|---|---|
|  |  |  | A | B | C | D |  |  | Sum |
|  | 0 |  | 0 | 0 | 0 | 0 |  |  | 0 |
|  | 1 |  | 0.004545 | 0 | 0 | 0 |  |  | 0.004545 |
|  | 2 |  | 0.013636 | 0 | 0 | 0 |  |  | 0.013636 |
|  | 3 |  | 0.031818 | 0 | 0 | 0 |  |  | 0.031818 |
|  | 4 |  | 0.045455 | 0 | 0 | 0 |  |  | 0.045455 |
|  | 5 |  | 0.05 | 0 | 0 | 0 |  |  | 0.05 |
|  | 6 |  | 0.05 |  | 0 | 0 |  |  | 0.05 |
| inflection | 7 |  | 0.0375 | 0.018182 | 0 | 0 |  |  | 0.055682 |
| point | 8 |  | 0.031818 | 0.054545 | 0 | 0 |  |  | 0.086364 |
|  | 9 |  | 0.027273 | 0.127273 | 0 | 0 |  |  | 0.154545 |
|  | 10 |  | 0.022727 | 0.181818 | 0 | 0 |  |  | 0.204545 |
|  | 11 |  | 0.018182 | 0.2 | 0 | 0 |  |  | 0.218182 |
|  | 12 |  | 0.015909 | 0.2 | 0 | 0 |  |  | 0.215909 |
|  | 13 |  | 0.013409 | 0.15 | 0.009091 | 0 |  |  | 0.1725 |
|  | 14 |  | 0.011136 | 0.127273 | 0.027273 | 0 |  |  | 0.165682 |
|  | 15 |  | 0.009773 | 0.109091 | 0.063636 | 0 |  |  | 0.1825 |
|  | 16 |  | 0.008182 | 0.090909 | 0.090909 | 0 |  |  | 0.19 |
|  | 17 |  | 0.007273 | 0.072727 | 0.1 | 0 |  |  | 0.18 |
|  | 18 |  | 0.006136 | 0.063636 | 0.1 | 0 |  |  | 0.169773 |
|  | 19 |  | 0.005227 | 0.053636 | 0.075 | 0.059091 |  |  | 0.192955 |
|  | 20 |  | 0.004545 | 0.044545 | 0.063636 | 0.177273 |  |  | 0.29 |
|  | 21 |  | 0 | 0.039091 | 0.054545 | 0.413636 |  |  | 0.507273 |
|  | 22 |  | 0 | 0.032727 | 0.045455 | 0.590909 |  |  | 0.669091 |

FROM FIG. 14A

| | | | | | | | |
|---|---|---|---|---|---|---|---|
| 23 | | | 0 | 0.029091 | 0.036364 | 0.65 | | 0.715455 |
| 24 | | | 0 | 0.024545 | 0.031818 | 0.65 | | 0.706364 |
| 25 | | | 0 | 0.020909 | 0.026818 | 0.4875 | | 0.535227 |
| 26 | | | 0 | 0.018182 | 0.022273 | 0.413636 | | 0.454091 |
| 27 | | | 0 | 0 | 0.019545 | 0.354545 | | 0.374091 |
| 28 | | | 0 | 0 | 0.016364 | 0.295455 | | 0.311818 |
| 29 | | | 0 | 0 | 0.014545 | 0.236364 | | 0.250909 |
| 30 | | | 0 | 0 | 0.012273 | 0.206818 | | 0.219091 |
| 31 | | | 0 | 0 | 0.010455 | 0.174318 | | 0.184773 |
| 32 | | | 0 | 0 | 0.009091 | 0.144773 | | 0.153864 |
| 33 | | | 0 | 0 | 0 | 0.127045 | | 0.127045 |
| 34 | | | 0 | 0 | 0 | 0.106364 | | 0.106364 |
| 35 | | | 0 | 0 | 0 | 0.094545 | | 0.094545 |
| 36 | | | 0 | 0 | 0 | 0.079773 | | 0.079773 |
| 37 | | | 0 | 0 | 0 | 0.067955 | | 0.067955 |
| 38 | | | 0 | 0 | 0 | 0.059091 | | 0.059091 |
| 39 | | | 0 | 0 | 0 | 0 | | 0 |
| 40 | | | 0 | 0 | 0 | 0 | | 0 |
| 41 | | | 0 | 0 | 0 | 0 | | 0 |
| 42 | | | 0 | 0 | 0 | 0 | | 0 |
| 43 | | | 0 | 0 | 0 | 0 | | 0 |
| 44 | | | 0 | 0 | 0 | 0 | | 0 |
| 45 | | | 0 | 0 | 0 | 0 | | 0 |
| 46 | | | 0 | 0 | 0 | 0 | | 0 |
| 47 | | | 0 | 0 | 0 | 0 | | 0 |
| 48 | | | 0 | 0 | 0 | 0 | | 0 |
| 49 | | | 0 | 0 | 0 | 0 | | 0 |
| 50 | | | 0 | 0 | 0 | 0 | | 0 |

FIG. 14B

OPTICAL POINT SOURCE DETECTION LOCATING SENSOR

RELATED APPLICATIONS

This application is a continuation-in-part of, and claims priority to, U.S. patent application Ser. No. 16/175,548, titled "OPTICAL POINT SOURCE DETECTION LOCATING SENSOR" and filed on Oct. 30, 2018, and claims priority to U.S. Provisional Patent Application No. 62/581,825, filed Nov. 6, 2017, both of which are incorporated herein by reference.

BACKGROUND

The present disclosure relates generally to optical detectors, and more specifically to an optical point source detection and locating sensor that uses a plurality of optical delays to locate an optical point source relative to an origin.

Optical sensors are used to detect optical sources but require expensive matching impedances and other matching components to achieve a high level of accuracy.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 13 is a table representing a deconvolution process, in accordance with an embodiment.

FIG. 14 is a table representing the normalized amplitude for four overlapping pulses, in accordance with an embodiment.

DETAILED DESCRIPTION

Figure 1:
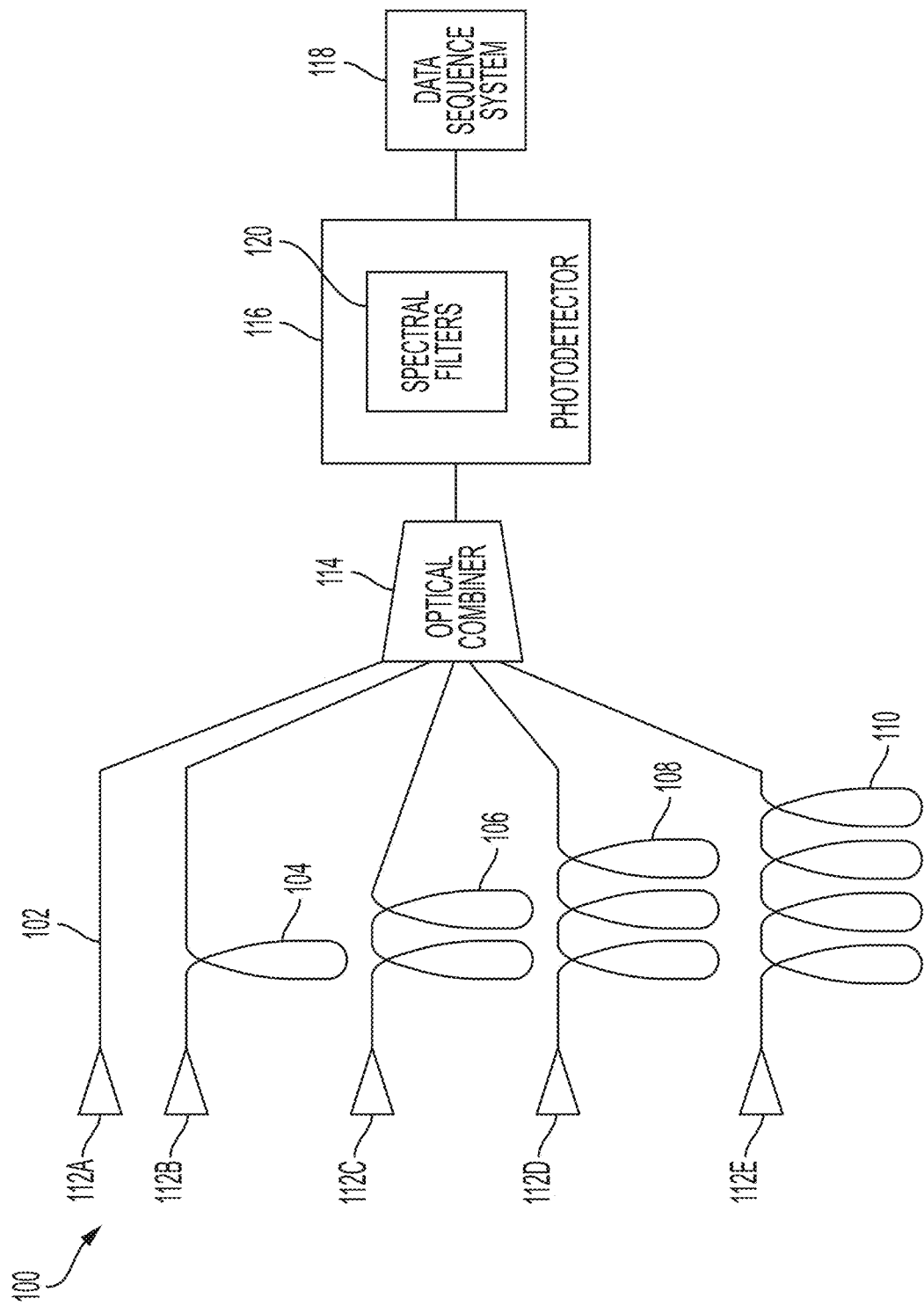
FIG. 1 is a diagram of a detector that includes a single optical reference fiber channel and four optical time delay fibers that are all coupled to a common optical combiner, photodetector circuit and data sequence system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure relates to the field of optical sensors that are used to detect and locate optical sources. Optical sensors can determine the relative angular coordinates of distant pulsing optical sources that are located within the sensor's field-of-regard. These optical sensors are complex devices and can require multiple photodetectors and associated electronics that are needed to process the signals generated by each photodetector. The performance characteristics of the individual photodetectors, such as gain, typically need to be matched as part of the sensor manufacturing and calibration process. Temperature compensation is typically required in order to maintain calibration and to ensure that each sensor's functional accuracy is not affected by time and/or temperature changes.

The device and system of an embodiment of the present disclosure can perform the same functions as more complex optical sensors in a much simpler way, such as by using a single photodetector circuit. Multiple optical fibers are used to simultaneously collect incoming optical energy and to then delay the collected optical energy in time before the optical energy reaches the photodetector in a serial stream, after which the optical energy is converted to an electronic signal used to calculate relative source position. This device requires fewer components, is smaller, less expensive to build and much simpler to calibrate than other approaches.

The device of an embodiment of the present disclosure detects optical energy from a distant pulsing point source, such as a laser or a reflection from a laser, and uses characteristics of impinging optical energy from the source to determine the position of the source relative to the device. The device uses a number of optical fibers to simultaneously collect incident pulse source energy. A reference signal is generated and specific time delays are introduced within the fibers in a prescribed manner, to temporally separate the pulses so that they can be received serially by a single photo-detector and processed serially by post-detection electronics to calculate the relative position of the source, or provide other relevant information.

FIG. 1 is a diagram of a detector 100 that includes a single optical reference fiber channel 102 and four optical time delay fibers 104, 106, 108 and 110 that are each coupled to an optical combiner 114, photodetector circuit 116 and data sequence system 118, in accordance with an example embodiment of the present disclosure. While optical fibers are shown as part of detector 100, other suitable optical transmission structures can also or alternatively be used, including but not limited to optical amplifiers, optical filters, optical delays and other suitable optical transmission structures.

In this embodiment, a pulsed optical signal is transmitted to a target, and reflections of the pulsed optical signal are received at apertures 112A through 112E, and optical time delay fibers 102 through 110 temporally separate pulsed energy arriving simultaneously at aperture 112A of optical reference fiber 102 and aperture 112B through 112E of optical time delay fibers 104 through 110, so they can be detected serially by a single photodetector 116, with the individual pulse amplitudes and pulse shapes preserved for processing by data sequence system 118. While four time delay fibers 104 through 110 are shown, a suitable number of time delay fibers can be used to provide greater or less discrimination, as discussed further herein.

Figure 2:
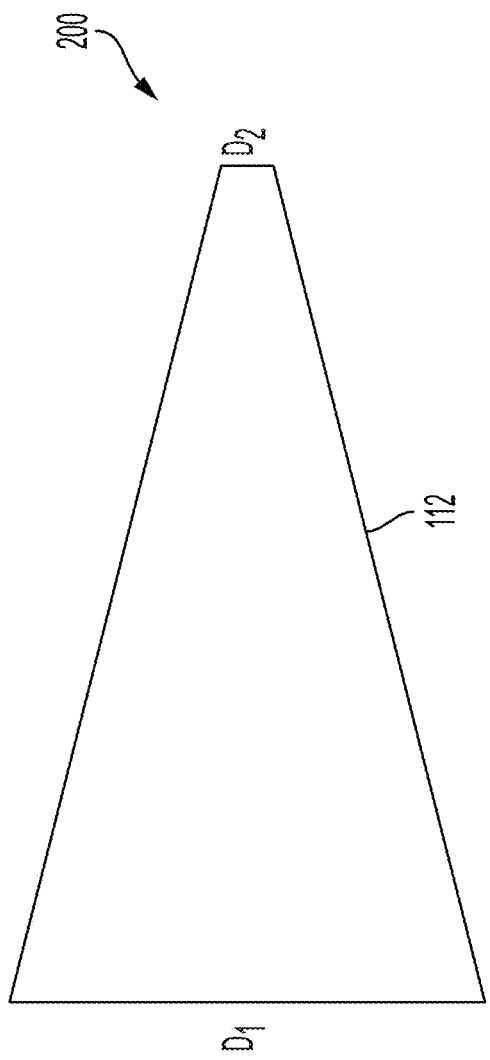
FIG. 2 is a diagram of an example aperture, in accordance with some embodiments.

FIG. 2 is a diagram of an example aperture 112, which is typical of apertures 112A through 112E, in accordance with the present disclosure. Diameter $D_1$ is the aperture input diameter and diameter $D_2$ is the aperture output diameter. Each aperture 112A through 112E can have the same values of $D_1$ and $D_2$, different values of $D_1$ and $D_2$ or a suitable combination of values of $D_1$ and $D_2$, as may suit a specific application. The optical gain provided by the taper is proportional to $(D_1/D_2)^2$. Using a taper also aids in packaging by reducing the diameter of the fiber behind the taper, which in turn reduces the fiber volume. The taper can be provided as shown in an aperture, can be provided over the length of the fiber, or can be provided in other suitable manners.

Returning to FIG. 1, apertures 112A through 112E of detector 100 collect reflected incident optical energy from a pulsing source. Both optical reference fiber 102 and optical time delay fibers 104 through 110 can have a straight or optional tapered geometry at the input end of the fiber. A straight fiber is simpler and less expensive and has a possible cost advantage if additional optical gain is not required. If additional optical gain is required, then a tapered aperture or other taper can be used for the fiber to increase the area of the front end (entrance aperture) of the fiber, which increases the amount of optical energy that can be collected, compared to an un-tapered fiber with the same core diameter.

Detector 100 converts the serial pulse stream of optical pulses into electronic pulses that are post-processed, during which angular position is determined. In a valid serial pulse stream, detectable signals from fibers 104 through 110 will appear in a specific order, at specific times. If there is no detectable signal received from any fiber, then a default amplitude value of 0 can be used for that fiber, for purposes of calculating co-efficient values. The lack of a detectable signal in a particular fiber or fibers(s) will not have any bearing on the how other detector signals are collected, reported and/or processed. The detector signals can be read in a specific order, and the amplitudes (or default zero) values can be used to calculate the position coefficients. Each detector can have a unique field-of-regard, which can cover a known portion of the sensor field-of-regard. Knowing the amplitude and where the signal is coming from allows the processor to calculate the relative position equations.

The sensor collects information from the scene in a particular manner and sends the collected information in a serial pulse stream to a post-processor. If a particular detector contains a detectable signal, it can be reported in a specific time interval in the stream. The presence of a detectable pulse in the stream, at a specific time, tells the processor where in the sensor's field-of-regard the energy was detected. That information and the respective signal amplitudes can be used to calculate equations.

Spectral filters 120 can be used to reduce unwanted background optical energy and increase the sensor signal-to-noise ratio. Spectral filters 120 can be included as a component of photodetector 116 as shown, but can also or alternatively be provided as separate components in the optical paths of the individual fibers, applied to the fibers themselves, integrated into optical combiner 114 or otherwise provided within detector 100.

Optical reference fiber 102 can have an acceptance angle which will be generated as discussed herein, and as further determined by the fiber core and cladding indices and the geometry of the fiber. Optical reference fiber 102 thus has an FOR that contains the total angle of interest in object space. If only one optical reference fiber 102 is used, then the acceptance angle of the optical reference fiber will determine the sensor FOR. If more than one optical reference fiber 102 is used, then the combined acceptance angles of all of the reference fibers will determine the sensor FOR. Energy from a pulsing optical source that is reflected from a location within the optical reference fiber FOR has the potential of being detected, and used to generate a reference signal, if other detection criteria such as a minimum signal-to-noise ratio is met. If more than one optical reference fiber is used in the sensor, their optical reference fiber lengths can be identical, so as to ensure that all of the pulse energy collected by the optical reference fibers exits them simultaneously.

Optical time delay fibers 104 through 110 can each have an acceptance angle that can be generated as a function of the fiber core and cladding indices and the geometry of each aperture and fiber. The array of optical time delay fibers 104 through 110 has a collective field-of-view, within which the relative angle coordinates of a reflection of a pulsing optical source can be determined using the temporal and amplitude characteristics of the signals received by the photodetector. Energy from a point that is reflected from a pulsing optical source located within the fields of view of optical time delay fibers 104 through 110 has the potential of being detected if other detection criteria is met, such as the signal-to-noise ratio. The acceptance angle orientation and the one or more of the optical time delay fiber optical parameters can be unique, so as to ensure that the pulses of simultaneously collected energy entering the energy collecting fibers will exit the fibers at different times, to avoid mixing of the energy from the pulses. Optional vignetting can be introduced to modify the acceptance angles of the optical delay fibers, to modify the acceptance angle shapes where suitable, using external apertures, non-circular cores and/or baffles to modify the amount of optical pulse energy entering the fibers, or in other suitable manners.

In one example embodiment, the length of each optical time delay fiber 104 through 110 can be unique. The time required for an optical signal to travel through each optical time delay fiber can be a function of the fiber length and the optical index of the fiber. Likewise, other suitable parameters such as the optical indices can also or alternatively be used to generate time delays within one or more of optical time delay fibers 104 through 110.

Optical reference fiber 102 and optical time delay fibers 104 through 110 each transmit the incident optical energy that is reflected from the pulsed source into optical combiner 114. Optical combiner 114 collects the energy from all of the fibers 102 through 110 and concentrates it onto a photoactive surface of photodetector 116, which converts the incident optical pulses to electrical signals that are sent to data sequence system 118.

The sequence of the pulses is used to determine the relative position of the pulsing optical reflections, which can have a suitable pulse width, such as 25 nanoseconds, a variable pulse width or other suitable pulse widths. Optical reference fiber 102 can have a circular FOR that is equal to its acceptance angle (which is the maximum angle of a ray relative to the fiber axis that hits the fiber core and which allows the incident light to be guided by the core), with a half angle of the acceptance angle of a degrees. Optical time delay fibers 104 through 110 can have identical acceptance angles, each with a half angle of β degrees. Optical time delay fiber 104 through 110 acceptance angles partially overlap and form the sensor field-of-view. In one example embodiment, the arrangement can be optimized to locate a monochromatic pulsing optical source/reflection (which is typical of a laser source or reflection from a laser source). Optical reference fiber 102 and fiber optic time delay fibers 104 through 110 in the example embodiment can have an index of refraction with a value of 1.5 at the pulsing optical source or reflection wavelength. The velocity of a monochromatic optical pulse (v) traveling through each optical fiber, reference fiber and optical time delay fiber (V) will be approximately equal to:

$$V \text{ fiber}=(n \text{ air}/n \text{ fiber})*v \text{ air}=2*10\ 10 \text{ cm/sec}=20 \text{ cm/nsec} \qquad \#\#EQU00001\#\#$$

where
$n_{fiber}$=refractive index in the fiber=1.5
$n_{air}$=refractive index in air=1.0
$v_{air}$=velocity in air=$3\times0^{10}$ cm/sec Therefore, optical pulse energy will travel through a 1 cm length of each fiber in $t_{cm}$ seconds, where $$t_{cm}=1/v_{fiber}=5\times10^{-11} \text{ seconds}$$

The optical pulses are propagated through the optical reference fiber 102 and fiber optic time delay fibers 104 through 110 to the photodetector. The optical energy from the pulsing optical source/reflections will enter the optical reference fiber 102 and optical time delay fibers 104 through 110 simultaneously at $\tau_0$. The indices of all the fibers can be identical, although different fiber diameters or indices can be used where suitable. If the indices are different, then the equations used to calculate the required fiber lengths to get the time delays as disclosed herein would need to be modified accordingly.

Optical reference fiber 102 has a length of $L_{102}$. The optical pulse from the source or reflection will propagate through the fiber, travel through optical combiner 114 and arrive at photodetector 116 at $\tau_{102}$.

Optical time delay fiber 104 has a length of $L_{104}$. The optical pulse from the source or reflection will propagate through the fiber, travel through optical combiner 114 and arrive at photodetector 116 at $\tau_{104}$. The optical pulses in this example embodiment can have a duration of 25 nsec, but other suitable pulse durations can also or alternatively be used. In accordance with an embodiment, the delays are at least as long as the 25 nsec duration of the optical pulse but in other embodiments, delays may be less than the duration of the optical pulse, so that the pulses arrive at the photodetector at overlapping intervals.

In accordance with an embodiment, in order to ensure that the optical pulse propagating through optical time delay fiber 104 arrives at optical combiner 114 after the 25 nsec long optical reference pulse from optical reference fiber 102, optical time delay fiber 104 can have a length of $L_{104}$, where:

$$L_{104}=L_{102}+25 \text{ nsec}*20 \text{ cm/nsec}=L_{102}+500 \text{ cm} \qquad \#\#EQU00002\#\#$$

In order to ensure that the optical pulse propagating through optical delay fiber 106 arrives at the combiner after the 25 nsec long pulse arriving at the photodetector from optical time delay fiber 104, optical time delay fiber 106 can have a length of:

$$L_{106}=L_{106}+500 \text{ cm}$$

In order to ensure that the optical pulse propagating through optical delay fiber 108 arrives at optical combiner 114 after the 25 nsec long pulse arriving at photodetector 116 from optical time delay fiber 106, optical time delay fiber 108 can have a length of:

$$L_{108}=L_{106}+500 \text{ cm}$$

In order to ensure that the optical pulse propagating through optical delay fiber 110 arrives at the combiner after the 25 nsec long pulse arriving at the photodetector from optical time delay fiber 108, optical time delay fiber 110 can have a length of:

$$L_{110}=L_{108}+500 \text{ cm}$$

In summary, in order to ensure that optical pulses propagating through optical reference fiber 102 and optical time delay fibers 104 through 110 arrive at photodetector 116 in a serial manner, with 25 nsec separation between pulses, optical delay fiber 104 can be 500 cm longer than optical reference fiber 102, optical time delay fiber 106 can be 1000 cm longer than optical reference fiber 102, optical time delay fiber 108 can be 1500 cm longer than optical reference fiber 102 and optical time delay fiber 110 can be 2000 cm longer than optical reference fiber 102. Likewise, other suitable lengths can be used for other pulse durations or optical parameters.

The optical pulse from optical reference fiber 102 can arrive at photodetector 116 after it arrives at optical combiner 114 at $\tau_{102}$. The pulse energy from optical time delay fibers 104 through 110 can then arrive 25 nsec, 50 nsec, 75 nsec and 100 nsec later, respectively, than the pulse from optical reference fiber 102. The relative amplitudes of all the optical energy pulses are preserved at photodetector 116, and the time delays separate the pulses sufficiently to allow a calculation of the azimuth and elevation angles to be made using the relative amplitude values associated with the different delay lines, as discussed further herein.

Optical reference fiber 102 has an aperture 112A with a half angle of a degrees. The acceptance angle is determined by the taper of aperture 112A, as well as the geometry and optical indices of the core and cladding indices of optical reference fiber 102. Likewise, apertures 112B through 112E of optical time delay fibers 104 through 110 all have acceptance cones with half angles of β degrees. The acceptance cones partially overlap so that they share a common field-of-view.

The amplitudes of the signals generated from the pulses from optical time delay fibers 104 through 110 will have values $I_{104}$, $I_{106}$, $I_{108}$ and $I_{110}$. Within the region formed by the overlapping optical time delay fiber acceptance angles, the relative location of the pulsing optical source or reflection in object space in the azimuth direction can be found using the azimuth angle equation and the relative location of the pulse in object space in the elevation direction can be found using the elevation equation, as discussed herein.

The normalized relative azimuth and elevation coordinates of a pulsing optical source or reflection located within overlap region of the optical time delay fibers will have values between 1 and −1. The actual angles can be determined using the actual maximum and minimum angles of the overlapping fields-of-view and are design specific.

The normalized relative azimuth angle is provided by the following equation, for a configuration in which there are two detector optical fibers such as optical time delay fibers 104 and 106 disposed adjacent to each other, relative to a centerline between the two detector optical fibers:

$$\Phi_{AZ}=(I_{104}-I_{106})/(I_{104}+I_{106})$$

The normalized relative elevation angle is provided by the following equation, for a configuration in which there are two detector optical fibers such as optical time delay fibers 108 and 110 disposed adjacent to each other, relative to a centerline between the two detector optical fibers:

$$\Phi_{EL}=(I_{108}-I_{110})/(I_{108}+I_{110})$$

In this example embodiment, the values $I_{104}$, $I_{106}$, $I_{108}$ and $I_{110}$ are the amplitudes of the signals out of detector 100 for the signals from optical time delay fibers 104 through 110. Likewise, for systems that include additional fibers at different offset angles for greater discrimination, the offset angle for each axis can be determined using similar equations.

Figure 3:
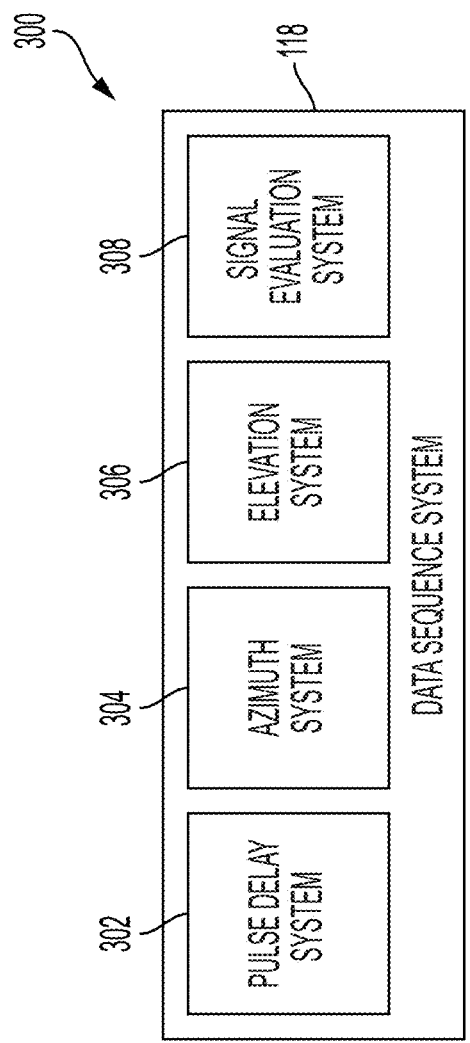
FIG. 3 is a diagram of a system for processing pulse sequence data, in accordance with some embodiments.

FIG. 3 is a diagram of a system 300 for processing pulse sequence data, in accordance with an example embodiment of the present disclosure. System 300 includes data sequence system 118 and pulse delay system 302, azimuth system 304, elevation system 306 and signal evaluation system 308, each of which can be implemented in hardware or a suitable combination of hardware and software.

Pulse delay system 302 receives signal data and identifies a sequence of pulses based on an expected delay between pulses. In one example embodiment, a pulse can have a predetermined duration, such as 25 nsec or other suitable durations, where the pulse is generated by a laser or other suitable device and is measured by a photodetector from a direct or reflected signal. Pulse delay system 302 can determine the first pulse in a sequence of pulses that are created by a plurality of optical delay circuits, such as where it is known that a single pulse will be generated once every first period and that the single pulse will last for a predetermined second period, where the second period is substantially greater than the first period, and where a sequence of pulses will be generated after the first pulse by the plurality of optical delay circuits.

Azimuth system 304 receives pulse magnitude data associated with two optical signals and determines an azimuth angle based on differences in signal amplitude. In one example embodiment, the received signal in an optical fiber with a field of regard that is offset from the center coordinate of a photodetector will have a greater amplitude than the signal received in another fiber with a field of regard that is offset by an equal amount in the opposite direction from the first fiber, where the two amplitudes provide an indication of the signal, relative to the sensor axis. This relationship can be used to determine an azimuth angle when two optical fibers are disposed along an axis that is parallel to the azimuth. Azimuth system 304 can also generate control or location data, such as to change a course heading of a guided missile, to generate a display with an expected location of a point source relative to an origin, or for other suitable purposes.

Elevation system 306 receives pulse magnitude data associated with two optical signals and determines an elevation angle based on differences in signal amplitude. In one example embodiment, an optical fiber with a field of regard that is offset from the center coordinate of a photodetector will have a greater amplitude than the signal received in another fiber that has a field-of-regard that is offset by an equal amount in the opposite direction from the first fiber, which provides an indication of an angle of incidence of the signal to an input aperture of the optical fiber. This relationship can be used to determine an elevation angle when two optical fibers are disposed along an axis that is parallel to the elevation. Elevation system 306 can also generate control or location data, such as to change a course heading of a guided missile, to generate a display with an expected location of a point source relative to an origin, or for other suitable purposes.

Signal evaluation system 308 receives signal data and processes the signal data to identify a recurring signal deviation. In one example embodiment, a signal such as a laser generated by a pointer device or other commercially available lasers can have pulse characteristics, amplitude variations or other detectable signal characteristics that allow a sequence of pulses to be detected, such as in a system that includes an optical reference fiber and a plurality of optical delay fibers. Signal evaluation system 308 can be used to identify a location where a laser device is being directed at a target, such as at a commercial plane cockpit, so as to allow ground authorities to be directed to the location or for other suitable purposes.

In operation, system 300 allows a plurality of signals to be analyzed to generate a guidance or location control, such as in a device that includes an optical reference fiber and a plurality of optical delay fibers. System 300 provide the technical feature of allowing signals generated in such a device to be analyzed to determine a location of a point source or reflected signal relative to an origin of a coordinate system, as mapped to a photodetector. System 300 thus provides substantially more than prior art systems for analyzing signals by using the signal analysis to generate guidance or location detection data that can be used to control a heading of a flying device, to identify a location where a signal is being transmitted from or for other suitable purposes.

Figure 4:
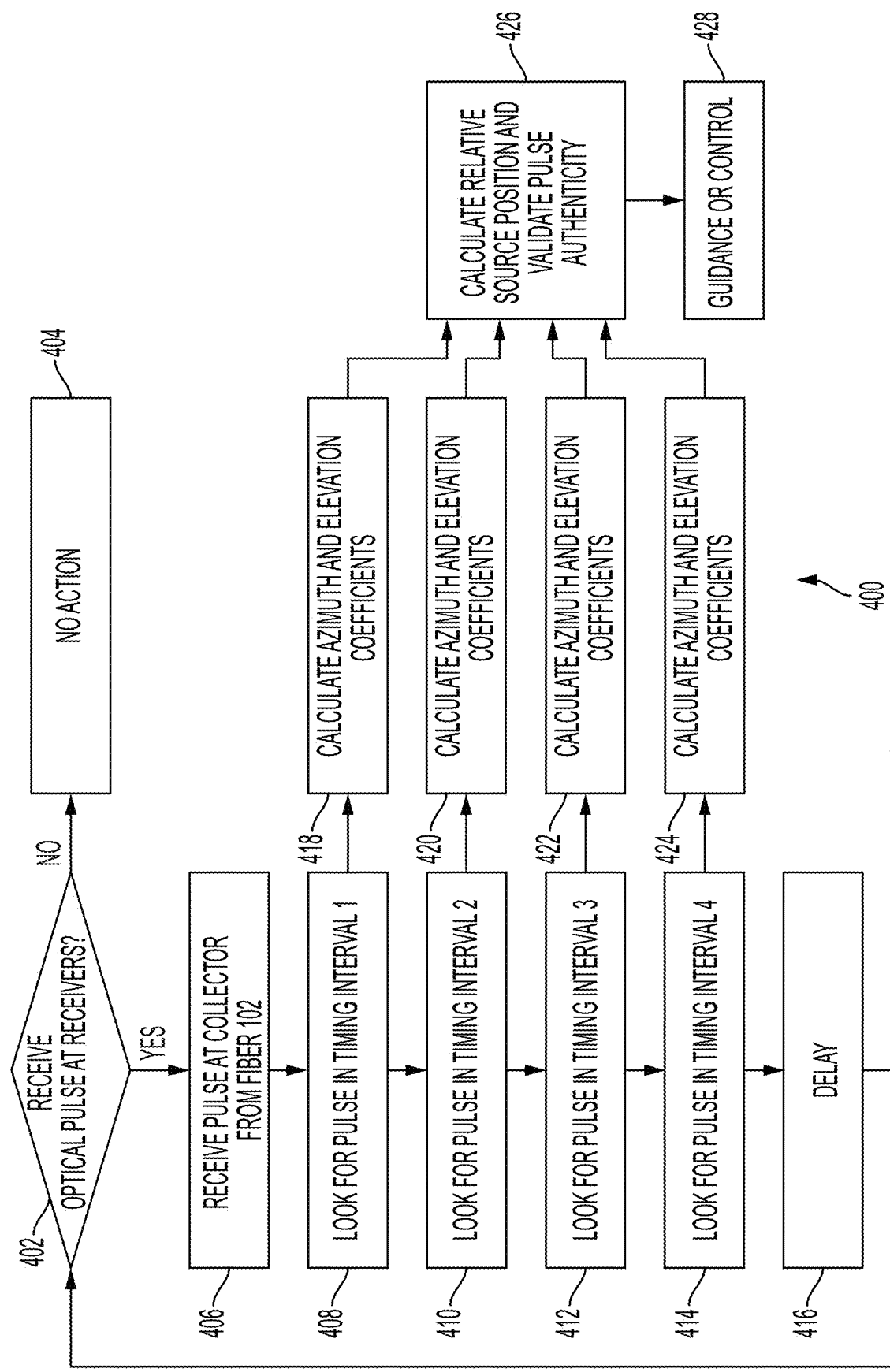
FIG. 4 is a diagram of an algorithm for generating control or location data from pulse or signal sequence data, in accordance with some embodiments.

FIG. 4 is a diagram of an algorithm 400 for generating control or location data from pulse or signal sequence data, in accordance with an example embodiment of the present disclosure. Algorithm 400 can be implemented on one or more processors of a detector system with a plurality of optical fibers or other suitable optical signal transmission structures.

Algorithm 400 begins at 402, where it is determined whether an optical pulse has been received at fiber receivers (apertures) 112A through 112E. If not, the algorithm proceeds to 404 and no action is taken, otherwise the algorithm proceeds to 406.

At 406, it is determined whether a pulse was received at the collector from fiber 102. The algorithm then proceeds to 408.

At 408, it is determined whether a pulse has been received from fiber 104 in timing interval 1. If so, the algorithm proceeds to 418 where a pulse amplitude is used to calculate azimuth and elevation coefficients that are used for source location determination equations. The algorithm then proceeds to 426 where the relative source position is determined, and pulse authenticity is validated. By validating the pulse authenticity, the detector system authenticates received optical pulses, discriminating intended laser pulse sources from noise or other unintended light sources. The algorithm then proceeds to 428 where the data is used for guidance, control or other suitable functions.

At 410, it is determined whether a pulse has been received from fiber 106 in timing interval 2. If so, the algorithm proceeds to 420 where a pulse amplitude is used to calculate azimuth and elevation coefficients that are used for source location determination equations. The algorithm then proceeds to 426 where the relative source position is determined, and pulse authenticity is validated. The algorithm then proceeds to 428 where the data is used for guidance, control or other suitable functions.

At 412, it is determined whether a pulse has been received from fiber 108 in timing interval 3. If so, the algorithm proceeds to 422 where a pulse amplitude is used to calculate azimuth and elevation coefficients that are used for source location determination equations. The algorithm then proceeds to 426 where the relative source position is determined, and pulse authenticity is validated. The algorithm then proceeds to 428 where the data is used for guidance, control or other suitable functions.

At 414, it is determined whether a pulse has been received from fiber 110 in timing interval 4. If so, the algorithm proceeds to 422 where a pulse amplitude is used to calculate azimuth and elevation coefficients that are used for source location determination equations. The algorithm then proceeds to 426 where the relative source position is determined, and pulse authenticity is validated. The algorithm then proceeds to 428 where the data is used for guidance, control or other suitable functions.

At 416, a delay is implemented, and the algorithm returns to 402.

In operation, algorithm 400 allows a plurality of signals to be analyzed to generate a guidance or location control, such as in a device that includes an optical reference fiber and a plurality of optical delay fibers. Algorithm 400 provides the technical feature of allowing signals generated in such a device to be analyzed to determine a location of a point source or reflected signal relative to an origin of a coordinate system, as mapped to a photodetector. Algorithm 400 thus provides substantially more than prior art systems for analyzing signals by using the signal analysis to generate guidance or location detection data that can be used to control a heading of a flying device, to identify a location where a signal is being transmitted from or for other suitable purposes.

In this example embodiment, a pulse with sufficient energy to be detected by the electronics can be simultaneously incident on the front faces of the five fiber receivers (apertures 112A through 112E). Source energy incident on the five fiber faces will reach the collector from fiber 102 first. If the source energy is strong enough to be detected, it will serve as a timing reference. The signal from fiber 102 does not need to serve any other function. As long as the pulse amplitude is sufficiently strong enough to be detected by the electronics, the exact value is irrelevant in this example embodiment.

Fiber 102 has a field-of-regard that can include the fields-of-regard of 104 through 110 Initially, any device using the sensor to calculate source location coefficients has no way of knowing if the detected pulse is from a designated target or if it is simply a spurious energy signal (or even a sufficiently high internal electronic noise spike). Further processing can determine that, using pulse repetition patterns, codes, shapes and so forth.

If signal is detected in 102, then an internal clock can be started in the signal processor, with the initial detection time being used to determine the pulse intervals between the initial pulse and any subsequent pulses. If energy from an external source is strong enough to elicit a detection through fiber 102, then at least one of the other fibers (104 through 110) should also get a strong enough signal to be detectable because at least one of the other fibers should have a mutual field-of-regard.

Depending on where the source is located within the sensor field-of-regard, if the incident energy is strong enough, fiber 102 can relay a detectable pulse to the collector and one or more of the four fibers used to calculate the relative source position.

Figure 5:
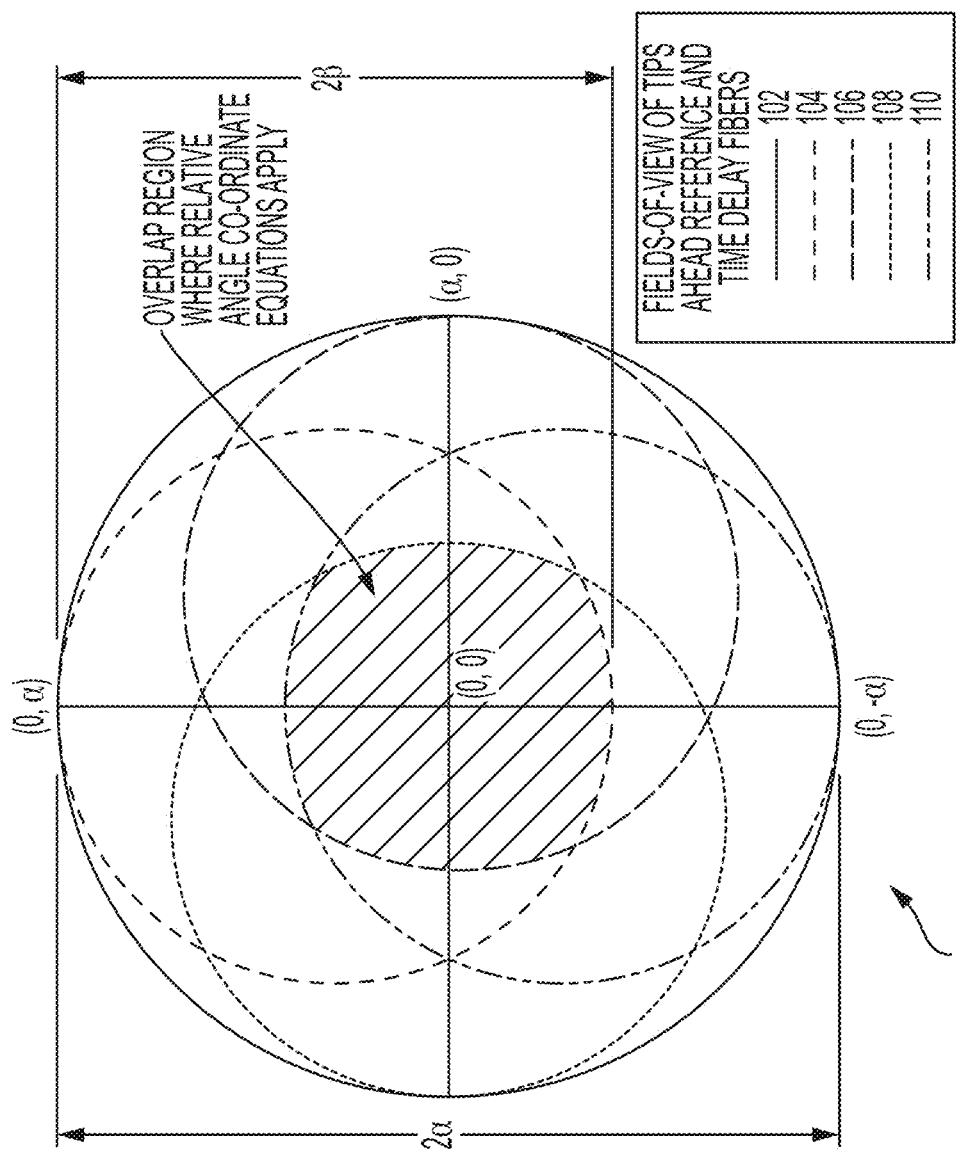
FIG. 5 is a diagram showing fields-of-view of an optical reference fiber and optical time delay fibers, in accordance with some embodiments.

Referring to FIG. 5, the big circle that encompasses all the other circles is the field-of-regard of reference fiber 102. That fiber can be used to relay a sufficiently strong source energy located within the solid angle in space depicted by the big circle. However, nothing is known about the location of the source other than it is within the fiber 102 field-of-regard and the signal is strong enough to be detected.

The smaller circle in the top of the figure represents the field-of-regard of fiber 104 and the smaller circle on the bottom of the circle represents the field-of-regard of fiber 110. The fields-of-regard of fibers 104 and 110 are effectively subsets of the reference fiber 102 field-of-regard. Note that source detected by the reference fiber 102 could be located anywhere within the big circle and therefore it is possible that fiber 102 could relay a detectable pulse and neither fibers 106 or 110 would have any detectable signal to relay to the collector, because it was not in their field(s)-of-regard.

For example, the four smaller circles representing the fields-of-regard of fibers 104, 106, 108 and 110 overlap. Considering just fibers 102, 106 and 110, if a sufficiently strong source is located within the reference fiber 102 field-of-regard but not in either fiber 106 or fiber 110 fields-of-regard (which could occur if the source is located somewhere like the far left region of the reference fiber field-of-regard and detectable by fiber 104 but not 106, 108 or 110, then the processor would detect the signal from the reference fiber but no signals would be detected from fibers 106 or 108. No information regarding the relative source position could be derived using fibers 106 or 108 (other than nothing was there that was sufficiently strong to detect).

If a sufficiently strong source was located within the field of regard of fiber 104, but not within the field-of-regard of fiber 102, then the source pulse energy entering both the reference fiber 102 and fiber 104 would be detected. Nothing from fiber 110 would be detected because the source was not located within the field-of-regard of fiber 108. Coefficient values for the location equations could be generated for fibers 106 and 108. Because the detector 104 co-efficient would have a value other than zero and detector 108 would have a value of zero generated by the signal processor due to no signal being detected (for purposes of doing the math). The relative location equation value would have a maximum value (either positive or negative depending on an assigned sign convention).

A maximum equation value is useful in that it indicates that the relative source location is within the sensor field-of-regard and is on one side of the centerline or the other. In this example, the source is determined to be somewhere above the axis, outside the overlap area.

If a sufficiently strong source is located within the fields-of-regard of both fiber 104 and fiber 108, then the source pulse energy entering both the reference fiber 102, fiber 106 and 110 are detected. Non-zero co-efficient values for the location equations is generated for fibers 106 and 108. The relative location equation value has a value between the maximum positive and negative values. That equation value corresponds to a unique relative position angle in the overlap area.

Even if source energy is detected in only one of fibers 104, 106, 108 and 110, all of the azimuth and elevation coefficients can be calculated. A source located at the fringe of the sensor field-of-regard might only be detected by one fiber while a source located close to the axis closer to the sensor axis could be detected by one, two, three or all of the fibers. The amplitude of the source signal relayed by the reference fiber doesn't matter, as long as it is detectable.

The relative amplitudes of the source signal relayed by fibers 104 through 110 does matter. In the overlap region, the ratios of the amplitudes are used to generate the relative source location in azimuth and elevation (in a Cartesian co-ordinate system but in general another appropriate co-ordinate system like Polar could be used).

If signal is detected, then an internal clock is started in the signal processor, with the initial detection time being used to determine the pulse intervals between the initial pulse and any subsequent pulses. If energy from an external source is strong enough to elicit a detection through fiber 102, then at least one of the other fibers 104 through 110 would also get a strong enough signal to be detectable because at least one of the other fibers would have a mutual field-of-regard.

In general, a fiber has an acceptance angle that is a function of the optical indices of the core and clad materials. If incident energy falls within the acceptance angle, the fiber will transmit the energy with a very low loss using total internal reflection (TIR). Conversely, if the incident energy falls outside the fiber's acceptance angle it will be rejected before it travels very far into the fiber by refraction through the outer walls of the fiber, which results in the sensor being able to convey very limited information regarding the relative location of the source, namely, that it was not detected, was detected outside the overlap region to the left or right, above or below the overlap region or was located within the overlap region.

By selectively vignetting fibers 104, 106, 108 and 110 using baffles, housing edges or other suitable mechanisms, the fiber acceptance angle can be used to determine whether energy gets relayed by the fiber, and the vignetting determines the relative amplitude. The amount of vignetting can be varied depending on a particular application.

Identical vignetting factors for fibers 104, 106, 108 and 110 of 0% where the overlap region begins, 50% at the point where the fiber acceptance cone intersects the sensor centerline and full vignetting where the overlap ends will provide a linear transfer function to a guidance and control system, which would be highly desirable. However, other vignetting values can be introduced to get variations of the transfer functions if desired.

FIG. 5 is a diagram 500 showing fields-of-view of optical reference fiber 102 and optical time delay fibers 104 through 110, in accordance with an example embodiment of the present disclosure. The field-of-view of optical reference fiber 102 encompasses the fields-of-view of optical time delay fibers 104 through 110, which overlap where relative angle coordinate equations apply. The equations can be used to locate a pulsing optical source or reflection in object space, such as for guidance, location or other suitable functions.

Figure 6:
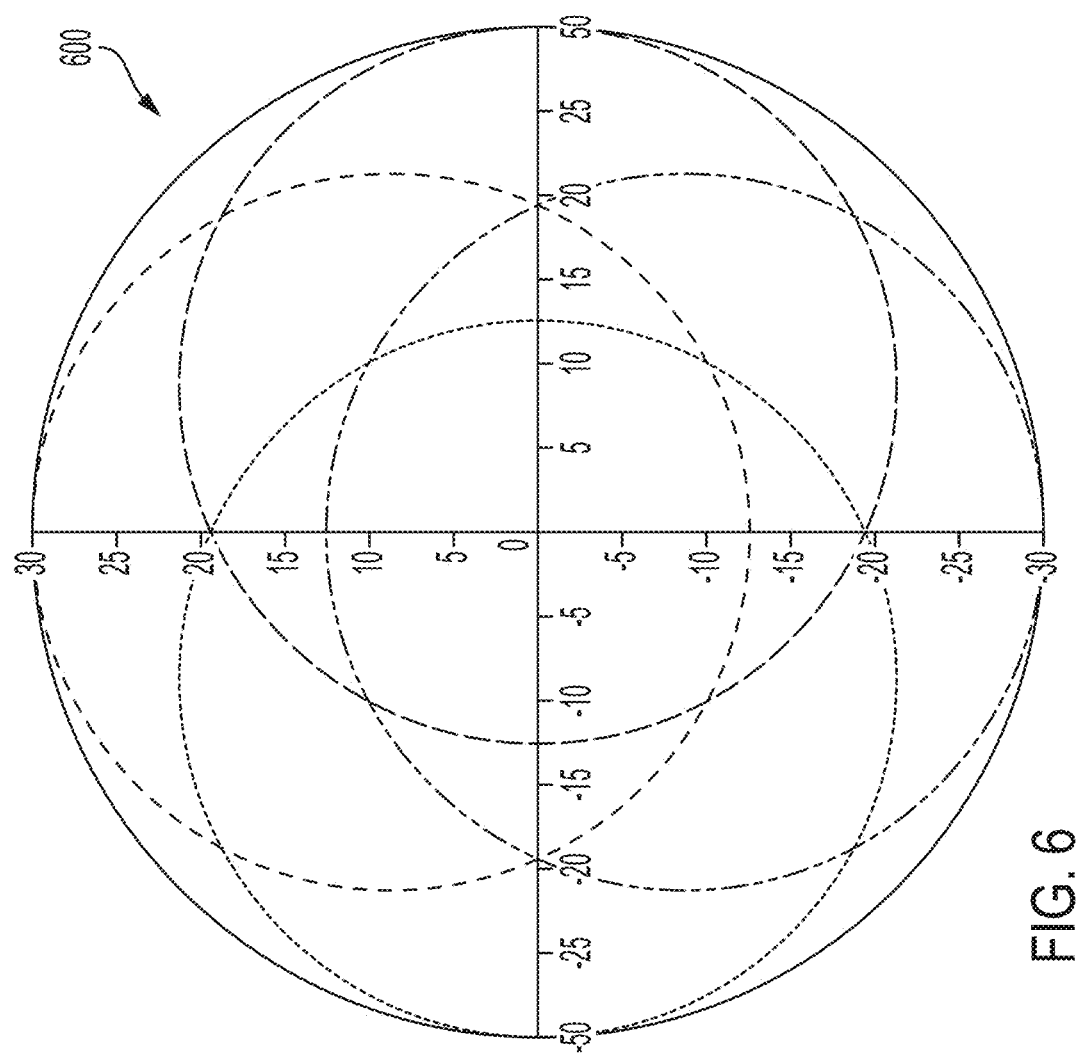
FIG. 6 is a diagram showing the field angles of a detector, in accordance with some embodiments.

FIG. 6 is a diagram 600 showing the field angles of detector 100, in accordance with an example embodiment of the present disclosure. Diagram 600 includes a circular FOR of 60 degrees (as determined by the acceptance angle of the optical reference fiber) and a linear region of approximately 20 degrees (determined by the overlapping portion of the acceptance angles of optical time delay fibers 104 and 106 in the X axis and by the overlapping portion of the acceptance angles of optical time delay fibers 108 and 110 in the Y direction).

In accordance with another embodiment, a detector 100 includes a single optical reference fiber channel 102 and four optical time delay fibers 104, 106, 108 and 110 that are each coupled to an optical combiner 114, photodetector circuit 116 and data sequence system 118. The lengths $L_{104}$, $L_{106}$, $L_{108}$ and $L_{110}$ of the optical time delay fibers 104, 106, 108 and 110 are significantly reduced from the previously described embodiments. Because the shape of the incoming pulses is standardized and known, amplitude data is derived from overlapping data. The length of the fibers 104, 106, 108 and 110 are of lengths $L_{104}$, $L_{106}$, $L_{108}$ and $L_{110}$ so that the pulses are offset but not completely separated in time when they arrive at the optical combiner 114. The laser designator pulses received by the detector 100 typically have a fast rise time, a short peak time and followed by a relatively long decay time.

Figure 7:
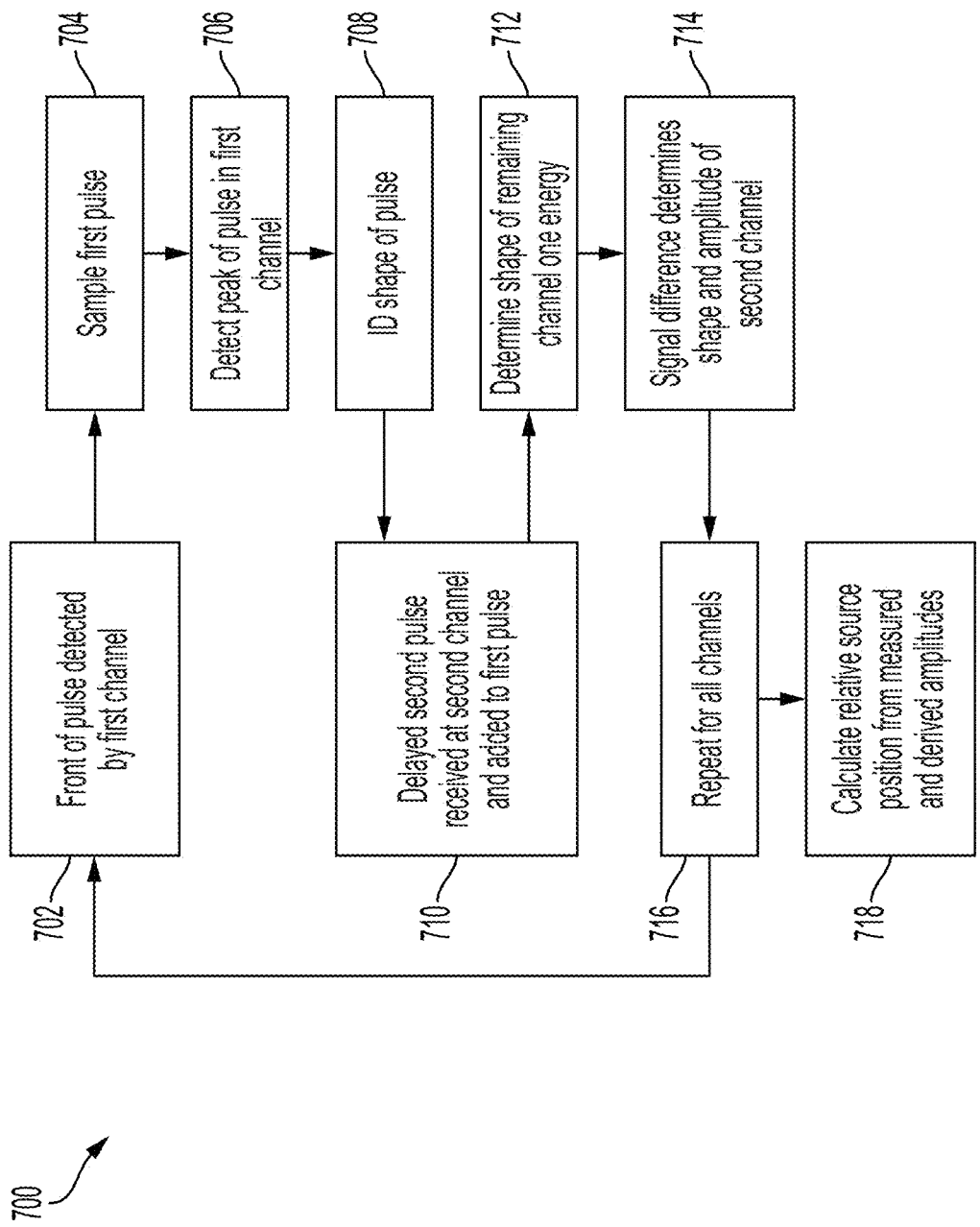
FIG. 7 is a diagram of an algorithm for generating control or location data from pulse or signal sequence data, in accordance with some embodiments.

FIG. 7 is a diagram of an algorithm 700 for generating control or location data from pulse or signal sequence data, in accordance with an embodiment. The an optical signal pulse is detected on a first channel in step 702. The received optical signal pulse is sampled in step 704 generating a first electrical signal. The peak amplitude of the first electrical signal is detected at step 706. The sampling continues for a period of time long enough to enable the photodetector 116, to accurately identify the shape of the pulse in step 708. For example, the sampling continues long enough for the amplitude of the pulse to reach the peak value of the pulse's amplitude. At that time, a delayed second optical signal pulse received at a second channel (fiber 104) is introduced into the optical combiner 114 and added to the first optical signal pulse in step 710. The delay introduced by the fiber 104 causes the second pulse to arrive at the optical combiner 114 at about the same time as the peak pulse value from the first channel. The peak amplitude value of the first channel is then used to determine the shape of the remaining part of the channel one energy in step 712, using the fact that an intended optical signal has a predicted format. The difference in the signals is used to determine the shape and amplitude of the front portion of the pulse received by the second channel in step 714, where the front portion includes the beginning of the pulse until the peak amplitude value of the pulse. This same process is repeated to determine the amplitudes of the other channels in step 716. When the amplitudes of the remaining channels are determined, the amplitudes of the channels are used to calculate the position of the optical signal source in step 718.

This embodiment uses shorter fibers, at a lower cost, with a smaller form factor, and is less susceptible to noise cause by stray light, or the like, in comparison with other approaches.

The mathematics used in the previously described embodiment are used to determine how long the fibers would need to be to achieve complete separation between pulses. Prior knowledge regarding the pulse shapes allows a system that uses the same hardware configuration (with significantly shorter fibers) to determine the source angle co-ordinates with significantly shorter fibers, by allowing the incoming delayed serial pulses to partially overlap when arriving at the detector. In this way, the bulk of the fibers is reduced, using the equations adjusted for shorter delay times, and using the timing information and standardized pulse shape information to find the amplitudes of all of the pulses, and using those amplitudes in conjunction with the azimuth and elevation derivation equations to determine the relative location of a pulse. The complete set of pulse amplitudes provide accurate estimates of the source location.

Selecting four (4) random amplitudes for the pulses with a random shape and a 20 ns duration. The pulse shape is used with the assigned pulse amplitudes to generate pulse height values for each pulse over 20 nanoseconds, in 1 nanosecond intervals. The pulse values for the pulse were put into columns. A pulse delay was simulated by shifting each successive pulse down to correspond to an N nanosecond delay with respect to the previous pulse. In the example, the second pulse is shifted down 6 cells where 1 cell corresponds to a 1 nanosecond time interval. The 3rd pulse is shifted 6 more nanoseconds and the 4th pulse 6 more for a total shift of 24 nanosecond.

The deconvolution process uses the first 6 samples of the first pulse to determine the arbitrary pulse shape over the first 6 nanoseconds. The electrical signal representing the second pulse arrives at the detector right after the first signal has peaked. The first pulse amplitude can be used with the measured amplitude of the first pulse to accurately derive all of the first pulse for each sampling interval. In the sampling interval in which the second pulse peak will occur, the second pulse peak amplitude is solved for by subtracting off the value of the first pulse, which occurred 1 delay time earlier. An accurate and complete profile of the second pulse can now be calculated. The third pulse shape can now be calculated by subtracting off the relevant values of the first pulse delayed 2 delay intervals and the 2nd pulse value delayed by 1 delay interval. The derived amplitude of the 3rd pulse and then the entire pulse shape can now be calculated. The fourth pulse shape is calculated in the same way.

The four (4) amplitude values that were arbitrarily picked as pulse amplitudes were derived using the described methodology The derived peak amplitudes of the 4 pulses entered into the angle equations produced the same position information as currently deployed systems using multiple detector arrays.

Figure 9:
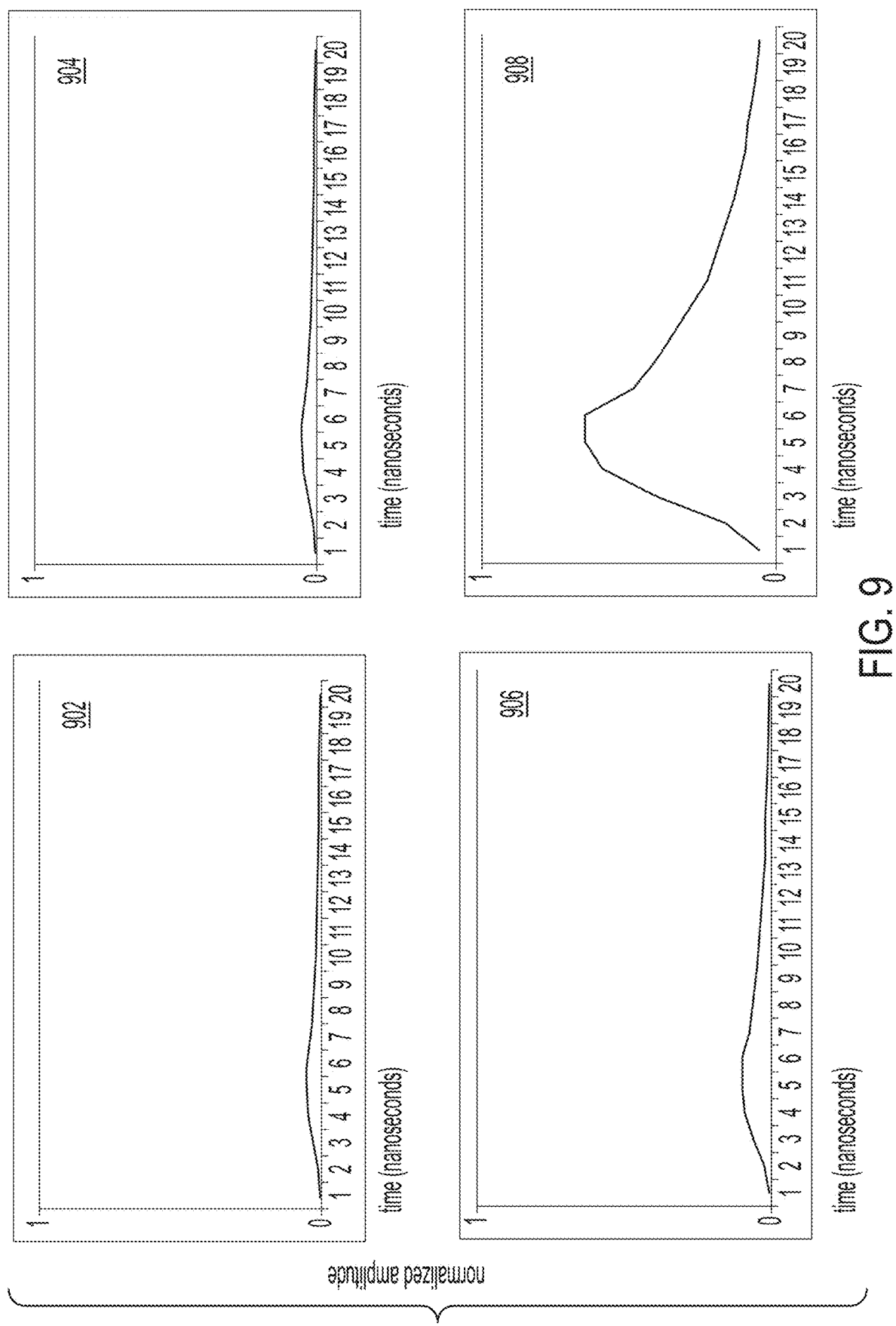
FIG. 9 is a diagram of four received pulses, in accordance with an embodiment.

FIG. 9 is a diagram of four received pulses, in accordance with an embodiment. The graphs show the normalized amplitude of four received pulses against time, measured in nanoseconds. Pulse 902 represents a pulse received in a first quadrant A. Pulse 904 represents a pulse received in second quadrant B. Pulse 906 represents a pulse received in a third quadrant C. Pulse 908 represents a pulse received in a third quadrant D. Table 1 shows an example of the normalized amplitudes for the four overlapping pulses.

TABLE 1

Normalized Amplitudes for 4 overlapping pulses

| Time | Interval | | | |
|---|---|---|---|---|
| | A | B | C | D |
| 1 | 0.09090909 | 0.00454545 | 0.01818182 | 0.00909091 | 0.05909091 |
| 2 | 0.27272727 | 0.01363636 | 0.05454545 | 0.02727273 | 0.17727273 |
| 3 | 0.63636364 | 0.03181818 | 0.12727273 | 0.06363636 | 0.41363636 |
| 4 | 0.90909091 | 0.04545455 | 0.18181818 | 0.09090909 | 0.59090909 |
| 5 | 1 | 0.05 | 0.2 | 0.1 | 0.65 |
| 6 | 1 | 0.05 | 0.2 | 0.1 | 0.65 |
| 7 | 0.75 | 0.0375 | 0.15 | 0.075 | 0.4875 |
| 8 | 0.63636364 | 0.03181818 | 0.12727273 | 0.06363636 | 0.41363636 |
| 9 | 0.54545455 | 0.02727273 | 0.10909091 | 0.05454545 | 0.35454545 |
| 10 | 0.45454545 | 0.02272727 | 0.09090909 | 0.04545455 | 0.29545455 |
| 11 | 0.36363636 | 0.01818182 | 0.07272727 | 0.03636364 | 0.23636364 |
| 12 | 0.31818182 | 0.01590909 | 0.06363636 | 0.03181818 | 0.20681818 |
| 13 | 0.26818182 | 0.01340909 | 0.05363636 | 0.02681818 | 0.17431818 |
| 14 | 0.22272727 | 0.01113636 | 0.04454545 | 0.02227273 | 0.14477273 |
| 15 | 0.19545455 | 0.00977273 | 0.03909091 | 0.01954545 | 0.12704545 |
| 16 | 0.16363636 | 0.00818182 | 0.03272727 | 0.01636364 | 0.10636364 |
| 17 | 0.14545455 | 0.00727273 | 0.02909091 | 0.01454545 | 0.09454545 |
| 18 | 0.12272727 | 0.00613636 | 0.02454545 | 0.01227273 | 0.07977273 |
| 19 | 0.10454545 | 0.00522727 | 0.02090909 | 0.01045455 | 0.06795455 |
| 20 | 0.09090909 | 0.00454545 | 0.01818182 | 0.00909091 | 0.05909091 |

Figure 10:
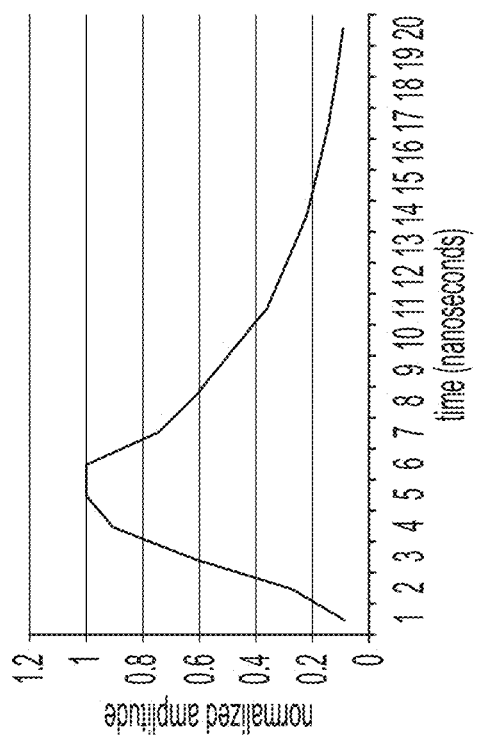
FIG. 10 is a diagram of an arbitrary laser pulse, in accordance with an embodiment.

FIG. 10 is a graph of an arbitrary laser pulse, in accordance with an embodiment. The graph shows the normalized amplitude of the pulse against time in nanoseconds. Table 2 shows an example of the normalized amplitude of the arbitrary laser pulse.

TABLE 2

| Interval | Normalized Amplitude |
|---|---|
| 1 | 0.09090909 |
| 2 | 0.27272727 |
| 3 | 0.63636364 |

TABLE 2-continued

| Interval | Normalized Amplitude |
|---|---|
| 4 | 0.90909091 |
| 5 | 1 |
| 6 | 1 |
| 7 | 0.75 |
| 8 | 0.63636364 |
| 9 | 0.54545455 |
| 10 | 0.45454545 |
| 11 | 0.36363636 |

TABLE 3

|  | A | B | C | D |
|---|---|---|---|---|
| Pick values for the 4 coefficients (make the sum 1 for energy based argument) | 0.05 | 0.2 | 0.1 | 0.65 |
| In a sensor utilizing a quadrant detector | | Vaz = −0.5 Vel = −0.7 | | |
| In APPA Sensor with no pulse overlap | | Vaz = −0.5 Vel = −0.7 | | |

Now consider deconvolving overlapped pulses that overlap immediately after an inflection is detected:

TABLE 4

Normalized Amplitudes for 4 overlapping pulses

| Time | Interval | | | | |
|---|---|---|---|---|---|
| | A | B | C | D | |
| 1 | 0.09090909 | 0.00454545 | 0.01818182 | 0.00909091 | 0.05909091 |
| 2 | 0.27272727 | 0.01363636 | 0.05454545 | 0.02727273 | 0.17727273 |
| 3 | 0.63636364 | 0.03181818 | 0.12727273 | 0.06363636 | 0.41363636 |
| 4 | 0.90909091 | 0.04545455 | 0.18181818 | 0.09090909 | 0.59090909 |
| 5 | 1 | 0.05 | 0.2 | 0.1 | 0.65 |
| 6 | 1 | 0.05 | 0.2 | 0.1 | 0.65 |
| 7 | 0.75 | 0.0375 | 0.15 | 0.075 | 0.4875 |
| 8 | 0.63636364 | 0.03181818 | 0.12727273 | 0.06363636 | 0.41363636 |
| 9 | 0.54545455 | 0.02727273 | 0.10909091 | 0.05454545 | 0.35454545 |
| 10 | 0.45454545 | 0.02272727 | 0.09090909 | 0.04545455 | 0.29545455 |
| 11 | 0.36363636 | 0.01818182 | 0.07272727 | 0.03636364 | 0.23636364 |
| 12 | 0.31818182 | 0.01590909 | 0.06363636 | 0.03181818 | 0.20681818 |
| 13 | 0.26818182 | 0.01340909 | 0.05363636 | 0.02681818 | 0.17431818 |
| 14 | 0.22272727 | 0.01113636 | 0.04454545 | 0.02227273 | 0.14477273 |
| 15 | 0.19545455 | 0.00977273 | 0.03909091 | 0.01954545 | 0.12704545 |
| 16 | 0.16363636 | 0.00818182 | 0.03272727 | 0.01636364 | 0.10636364 |
| 17 | 0.14545455 | 0.00727273 | 0.02909091 | 0.01454545 | 0.09454545 |
| 18 | 0.12272727 | 0.00613636 | 0.02454545 | 0.01227273 | 0.07977273 |
| 19 | 0.10454545 | 0.00522727 | 0.02090909 | 0.01045455 | 0.06795455 |
| 20 | 0.09090909 | 0.00454545 | 0.01818182 | 0.00909091 | 0.05909091 |

TABLE 2-continued

| Interval | Normalized Amplitude |
|---|---|
| 12 | 0.31818182 |
| 13 | 0.26818182 |
| 14 | 0.22272727 |
| 15 | 0.19545455 |
| 16 | 0.16363636 |
| 17 | 0.14545455 |
| 18 | 0.12272727 |
| 19 | 0.10454545 |
| 20 | 0.09090909 |

Figure 11:
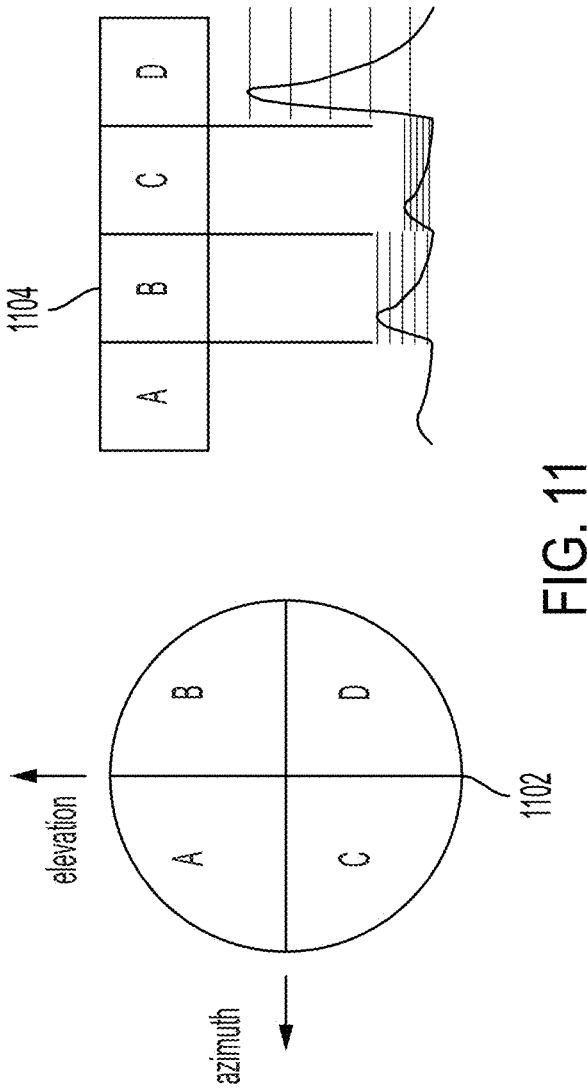
FIG. 11 is a diagram of a four sensor arrangement and the received pulses, in accordance with an embodiment.

FIG. 11 is a diagram of a four quadrant sensor and the received pulses, in accordance with an embodiment. Sensor 1102 receives signals in four quadrants A, B, C and D. The quadrants are arranged so that they define an elevation and an azimuth, as shown. Each of the quadrants receives a pulse as shown at 1104. The elevation value can be calculated using the equation: $Vaz=((A+B)-(C+D))/(A+B+C+D)$. The azimuth value can be calculated using the equation $Vel=((A+C)-(B+D))/(A+B+C+D)$. This assumes that the coefficient values are equal to the values of the normalized peaks but normalized integrated values are equally valid. Table 3 shows a example of the azimuth and elevation value calculations. Table 4 shows an example of normalized amplitudes for four overlapping pulses.

A set of 4 A, B C and D terms are used to calculate the az and el coefficients for laser energy incident on a conventional system. Then, those same four (4) terms are used to generate 4 signal profiles with peak amplitudes proportional to the A, B C and D terms.

The last table illustrates how the summed signals are separated and A, B, C and D terms identical to the terms generated by a conventional system. The az and el values used for guidance are identical.

Figure 12:
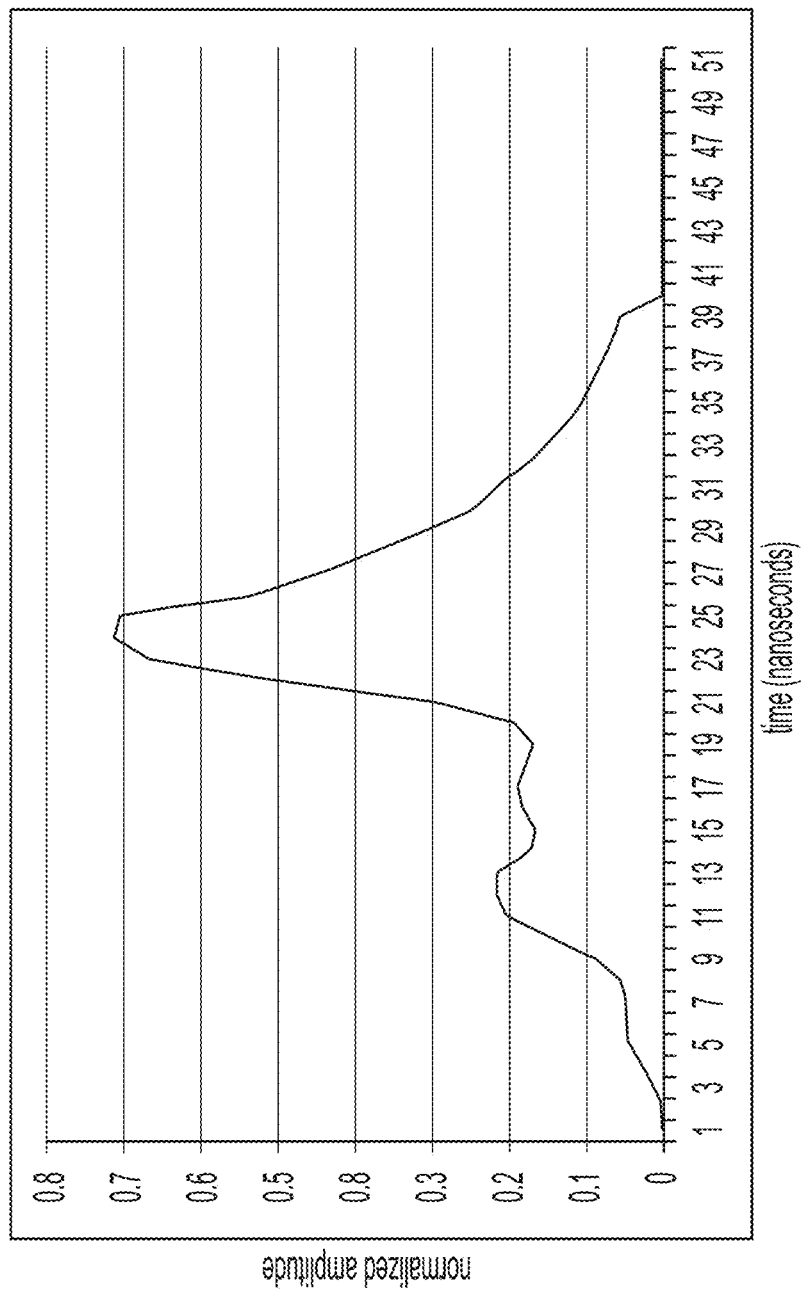
FIG. 12 is a graph of the combined received pulses, in accordance with an embodiment.

FIG. 12 is a graph of the combined received pulses, in accordance with an embodiment. The graph shows the normalized amplitude of the received pulses against time in nanoseconds.

FIG. 13 is a table representing a deconvolution process, in accordance with an embodiment. The initial values (rows 0-6) received in A are used to derive the values for B, which are then used to derive the values for C, which are then used to derive the values for D. The remainder of values for A are derived using the first 6 amplitude values and the known pulse shape. This process repeats for B and C.

FIG. 14 is a table representing the normalized amplitude for four overlapping pulses, in accordance with an embodiment. The inflection points for the received data are recognized at rows 7, 13, 19 and 25. The inflection points are used to indicate the start of a new pulse.

Figure 8:
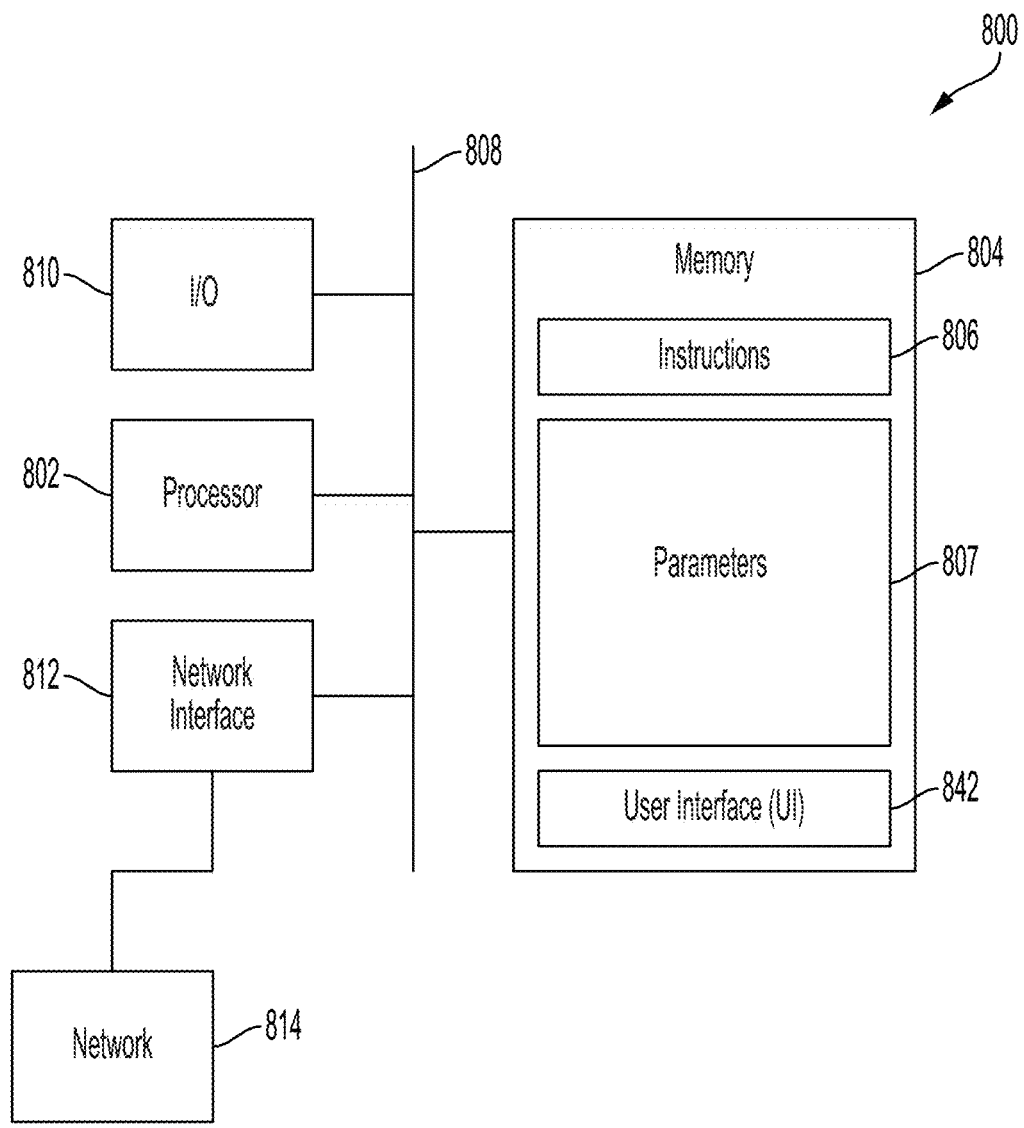
FIG. 8 is a high-level block diagram of a processor-based system usable in conjunction with one or more embodiments.

FIG. 8 is a block diagram of a signal processing system 800 in accordance with some embodiments.

In some embodiments, signal processing system 800 is a general purpose computing device including a hardware processor 802 and a non-transitory, computer-readable storage medium 804. In at least some embodiments, data sequence system 118 (FIG. 1) is a signal processing system 800. Storage medium 804, amongst other things, is encoded with, i.e., stores, computer program code 806, i.e., a set of executable instructions. Execution of instructions 806 by hardware processor 802 represents (at least in part) a signal processing tool which implements a portion or all of the methods described herein in accordance with one or more embodiments (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause system 800 to be usable for performing a portion or all of the noted processes and/or methods. In one or more embodiments, storage medium 804 also stores information which facilitates performing a portion or all of the noted processes and/or methods. In one or more embodiments, storage medium 804 stores parameters 807.

Signal processing system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

Signal processing system 800 also includes network interface 812 coupled to processor 802. Network interface 812 allows system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 800.

Signal processing system 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. signal processing system 800 is configured to receive information related to a UI through I/O interface 810. The information is stored in computer-readable medium 804 as user interface (UI) 842.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for processing optical signals comprising:
    a reference optical signal transmission structure configured to receive an optical signal at a first input and to provide the optical signal at a first output to a photodetector;
    a delay optical signal transmission structure configured to receive the optical signal at a second input and to provide a delayed optical signal at a second output to the photodetector so that the delayed optical signal at the second output is provided to the photodetector while the first output is provided to the photodetector; and
    a signal processor configured to receive a first electric signal corresponding to the optical signal and a second electric signal corresponding to the delayed optical signal and to generate an output as a function of the first electric signal and the second electric signal by adding the first electric signal to the second electric signal, determining the shape of the first electric signal and using the difference between the first electric signal and the first electric signal added to the second electric signal to determine the amplitude of the second electric signal, wherein the first input has a predetermined spatial relationship to the second input in a coordinate system.

2. The system of claim 1, wherein the signal processor samples the first electric signal.

3. The system of claim 2, wherein the signal processor detects an amplitude of the first electric signal.

4. The system of claim 3, wherein the signal processor uses the sampled first electric signal to identify a first portion of the shape of the first electric signal.

5. The system of claim 4, wherein the signal processor uses the added first electric signal and second electric signal to determine a second portion of the shape of the first electric signal.

6. The system of claim 5, wherein the signal processor uses a difference between the added first electric signal and second electric signal, and the first and second portion of the shape of the first electric signal to determine the shape of the second electric signal.

7. The system of claim 5, wherein the signal processor uses a difference between the added first electric signal and second electric signal, and the amplitude of the first electric signal to determine the amplitude of the second electric signal.

8. The system of claim 4 further comprising a third delay optical signal transmission structure configured to receive the optical signal at a fourth input and to provide a third delayed optical signal at a fourth output to the photodetector, a fourth delay optical signal transmission structure configured to receive the optical signal at a fifth input and to provide a fourth delayed optical signal at a fifth output to the photodetector.

9. The system of claim 8 wherein the first input has a first predetermined spatial relationship to the second input, the third input, the third input and the fourth input and the signal processor is configured to generate a relative source position as a function of the first predetermined spatial relationship in a coordinate system, a delay value of the delay optical signal transmission structure, a delay value of the second delay optical signal transmission structure, a delay value of the third delay optical signal transmission structure and a delay value of the fourth delay optical signal transmission structure.

10. The system of claim 1 wherein the generated output is a relative source position.

11. The system of claim 1 wherein the reference optical signal transmission structure comprises an optical fiber.

12. The system of claim 1 wherein the delay optical signal transmission structure comprises an optical fiber.

13. The system of claim 1 further comprising a second delay optical signal transmission structure configured to receive the optical signal at a third input and to provide a second delayed optical signal at a third output to the photodetector.

14. The system of claim 13 wherein the first input has a first predetermined spatial relationship in a coordinate system to the second input and the third input and the signal processor is configured to generate a relative source position as a function of the first electric signal, the second electric signal, the third electric signal, the first predetermined spatial relationship and a delay value of the delay optical signal transmission structure.

15. The system of claim 13 wherein the first input has a first predetermined spatial relationship to the second input and the third input, the second input has a second predetermined spatial relationship to the third input and the signal processor is configured to generate a relative source position as a function of the first electric signal, the second electric signal, the third electric signal, the first predetermined spatial relationship, the second predetermined spatial relationship and a delay value of the delay optical signal transmission structure.

16. The system of claim 13 wherein the first input has a first predetermined spatial relationship to the second input and the third input, the second input has a second predetermined spatial relationship to the third input and the signal processor is configured to generate a relative source position as a function of the first electric signal, the second electric signal, the third electric signal, the first predetermined spatial relationship, the second predetermined spatial relationship, a delay value of the delay optical signal transmission structure and a delay value of the second delay optical signal transmission structure.

17. The system of claim 1 wherein the first input has a predetermined spatial relationship to the second input and the signal processor is configured to generate an azimuth coefficient as a function of the first electric signal, the second electric signal, the predetermined spatial relationship and a delay value of the delay optical signal transmission structure, wherein the azimuth coefficient identifies an azimuth relative to a location of the first input and a location of the second input.

18. The system of claim 1 wherein the signal processor is configured to receive a third electric signal corresponding to the second delayed optical signal and to generate an output as a function of the first electric signal, the second electric signal and the third delayed optical signal.

19. The system of claim 1 wherein the first input has a predetermined spatial relationship to the second input in a coordinate system and the signal processor is configured to generate the output as a function of the first electric signal, the second electric signal and the predetermined spatial relationship.

20. The system of claim 1, wherein the first input and the second input each have a predetermined associated field of view in a coordinate system and the signal processor is configured to generate the output as a function of the first electric signal, the second electric signal, a spatial relationship between the first input field of view and the second input field of view in the coordinate system and a delay value of the delay optical signal transmission structure.

21. The system of claim 20 wherein the signal processor is configured to generate a relative source position as a function of the azimuth coefficient and the elevation coefficient.

22. The system of claim 20 further comprising a second delay optical signal transmission structure configured to receive the optical signal at a third input and to provide a second delayed optical signal at a third output to the photodetector.

23. The system of claim 1 wherein a field of view of the first input has a predetermined spatial relationship to a field of view of the second input and the signal processor is configured to generate a relative source position as a function of the first electric signal, the second electric signal, the field of view of the first input, the field of view of the second input and a delay value of the delay optical signal transmission structure.

24. The system of claim 1 wherein the first input has a predetermined spatial relationship to the second input and the signal processor is configured to generate an elevation coefficient as a function of the first electric signal, the second electric signal, the predetermined spatial relationship and a delay value of the delay optical signal transmission structure, wherein the elevation coefficient identifies an azimuth relative to a location of the first input and a location of the second input in a coordinate system.

25. The system of claim 24 wherein the signal processor is configured to generate a relative source position in a coordinate system as a function of the azimuth coefficient.

26. The system of claim 24 wherein the signal processor is configured to generate a relative source position in a coordinate system as a function of the elevation coefficient.

27. The system of claim 1 wherein the first input has a predetermined spatial relationship to the second input and the signal processor is configured to generate an elevation coefficient and an azimuth coefficient relative to an origin as a function of the first electric signal, the second electric signal, the predetermined spatial relationship and a delay value of the delay optical signal transmission structure.

* * * * *